(12) United States Patent
Yan et al.

(10) Patent No.: US 10,133,005 B2
(45) Date of Patent: Nov. 20, 2018

(54) WAVELENGTH SELECTIVE SWITCH, RECONFIGURABLE OPTICAL ADD/DROP MULTIPLEXER, AND WAVELENGTH SELECTION METHOD

(71) Applicant: Huawei Technologies Co., Ltd., Shenzhen (CN)

(72) Inventors: Yunfei Yan, Shenzhen (CN); Han Zhao, Shenzhen (CN); Zhiyong Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/866,058

(22) Filed: Jan. 9, 2018

(65) Prior Publication Data

US 2018/0128984 A1 May 10, 2018

Related U.S. Application Data

(63) Continuation of application No. PCT/CN2015/083789, filed on Jul. 10, 2015.

(51) Int. Cl.
*G02B 6/35* (2006.01)
*G02B 6/293* (2006.01)
(Continued)

(52) U.S. Cl.
CPC ......... *G02B 6/3546* (2013.01); *G02B 6/2773* (2013.01); *G02B 6/293* (2013.01);
(Continued)

(58) Field of Classification Search
CPC ............................ G02B 6/356; G02B 6/29311
See application file for complete search history.

(56) References Cited

U.S. PATENT DOCUMENTS 9,588,299 B2 * 3/2017 Mao .................. G02B 6/29311
2012/0237218 A1 9/2012 Yang et al.
(Continued)

FOREIGN PATENT DOCUMENTS

CN 102226848 A 10/2011
CN 102868476 A 1/2013
(Continued)

OTHER PUBLICATIONS

Machine Translation and Abstract of Chinese Publication No. CN1052226848, Oct. 26, 2011, 11 pages.
(Continued)

*Primary Examiner* — Omar R Rojas
(74) *Attorney, Agent, or Firm* — Conley Rose, P.C.

(57) ABSTRACT

A wavelength selective switch (WSS), including an input optical fiber collimation array, a first optical switching engine, a dispersion device, an optical path converter, a second optical switching engine, a third optical switching engine, and an output optical fiber collimation array. A first beam is input from a first port of the input optical fiber collimation array. The first optical switching engine performs angle deflection on the first beam on a first plane. The dispersion device demultiplexes, on a second plane, the angle-deflected first beam into multiple sub-wavelength beams. The second optical switching engine performs angle deflection on the multiple sub-wavelength beams that are obtained by demultiplexing. The dispersion device multiplexes, on the second plane, the angle-deflected multiple sub-wavelength beams. The third optical switching engine performs angle deflection on the multiplexed multiple sub-wavelength beams on the first plane.

20 Claims, 13 Drawing Sheets

(51) Int. Cl.
*H04Q 11/00* (2006.01)
*G02B 6/27* (2006.01)
*G02B 6/32* (2006.01)
*H04J 14/02* (2006.01)

(52) U.S. Cl.
CPC ....... *G02B 6/2938* (2013.01); *G02B 6/29371* (2013.01); *G02B 6/32* (2013.01); *G02B 6/356* (2013.01); *G02B 6/3524* (2013.01); *G02B 6/3594* (2013.01); *H04J 14/0212* (2013.01); *H04Q 11/0005* (2013.01); *G02B 6/3512* (2013.01); *H04Q 2011/0016* (2013.01); *H04Q 2011/0026* (2013.01); *H04Q 2011/0035* (2013.01); *H04Q 2011/0039* (2013.01)

(56) References Cited

U.S. PATENT DOCUMENTS

2016/0124152 A1   5/2016   Ohtsuka et al.
2016/0216452 A1   7/2016   Suzuki et al.

FOREIGN PATENT DOCUMENTS

CN    104317006 A      1/2015
WO    2012125390 A2    9/2012
WO    2015008349 A1    1/2015
WO    2015008403 A1    1/2015

OTHER PUBLICATIONS

Machine Translation and Abstract of Chinese Publication No. CN102868476, Jan. 9, 2013, 14 pages.
Machine Translation and Abstract of Chinese Publication No. CN104317006, Jan. 28, 2015, 16 pages.
Foreign Communication From a Counterpart Application, International Application No. PCT/CN2015/083789, English Translation of International Search Report dated Apr. 13, 2016, 2 pages.
Foreign Communication From a Counterpart Application, International Application No. PCT/CN2015/083789, English Translation of Written Opinion dated Apr. 13, 2016, 3 pages.
Foreign Communication From a Counterpart Application, European Application No. 15897936.9, Extended European Search Report dated Jun. 15, 2018, 11 pages.

* cited by examiner

US 10,133,005 B2

WAVELENGTH SELECTIVE SWITCH, RECONFIGURABLE OPTICAL ADD/DROP MULTIPLEXER, AND WAVELENGTH SELECTION METHOD

CROSS-REFERENCE TO RELATED APPLICATION

This application is a continuation of International Patent Application No. PCT/CN2015/083789 filed on Jul. 10, 2015, which is hereby incorporated by reference in its entirety.

TECHNICAL FIELD

The present disclosure relates to the communications field, and in particular, to a wavelength selective switch (WSS), a reconfigurable optical add/drop multiplexer, and a wavelength selection method.

BACKGROUND

With rapid development of Reconfigurable Optical Add-Drop Multiplexer (ROADM) technologies, a colorless, directionless, and contentionless (CDC) ROADM is a development direction of a future ROADM architecture. Colorless means that any port can be used for outputting any wavelength, directionless means that any wavelength can be scheduled to any direction, and contentionless means that there is no wavelength conflict when a same wavelength needs to be locally added and dropped simultaneously in multiple directions.

As shown in FIG. 1, an ROADM architecture includes a line-side wavelength switching module and a client-side wavelength switching module. The line-side wavelength switching module is connected to the client-side wavelength switching module using an optical fiber. The line-side wavelength switching module may include multiple WSSs and splitters (SPs). One WSS and one SP constitute a wavelength switching sub-module in one direction. FIG. 1 shows wavelength switching sub-modules in three directions, including an east dimension, a west dimension, and a north dimension. The client-side wavelength switching module includes an add module and a drop module. The add module includes multiple transmitters (designated as TX) and one WSS, and the drop module includes multiple receivers (designated as RX) and one WSS. The east dimension is used as an example. For a Wavelength Division Multiplex (WDM) optical signal input from the east dimension, the optical signal is first broadcast to other several dimensions and the client-side drop module using an SP. For a wavelength that needs to be locally downloaded from the client side, the client-side drop module selects and receives the wavelength. For a wavelength that needs to be transferred from a WSS in the east dimension to a WSS in the west dimension, the WSS in the west dimension selects the wavelength and transfers the wavelength, and blocks wavelengths that are from other dimensions.

WSSs in other approaches have beam multiplexing and beam demultiplexing functions. FIG. 2A is a schematic diagram of a top view of an optical path structure of an N×M WSS in the other approaches. FIG. 2B is a schematic diagram of a side view of an optical path structure of an N×M WSS in the other approaches. As shown in FIG. 2A and FIG. 2B, a WDM signal is input from an input port 201 (i.e., an input optical fiber), is collimated by a collimator array 202, and is demultiplexed into K sub-wavelength signals by a first-stage grating 203. The K sub-wavelength signals are incident to a first-stage optical switching array 206 after passing through a cylindrical lens array 204 and a lens 205. The first-stage optical switching array 206 has N rows, and there are K optical switch units in each row. Each optical switch unit deflects one sub-wavelength signal such that the sub-wavelength signal is incident to a corresponding optical switch unit in a second-stage optical switching array 207. The second-stage optical switching array 207 has M rows, and there are K optical switch units in each row. Each optical switch unit corresponds to one sub-wavelength signal. The optical switch unit corrects an angle of the sub-wavelength signal such that the sub-wavelength signal is parallel to a direction of an optical axis (Z) in a YZ plane. All sub-wavelength signals are incident to a second-stage grating 210 after passing through a lens 208 and a cylindrical lens array 209, output to a collimator array 211 after being multiplexed by the second-stage grating 210, and finally output from an output port 212 (i.e., an output optical fiber). Actually, the first-stage optical switching array 206 and the second-stage optical switching array 207 perform optical switching only on a YX plane, and each optical switch unit implements a wavelength selection function by performing deflection in one dimension. The first-stage grating 203 and the first-stage optical switching array 206 implement a "beam demultiplexing" function, and switch the sub-wavelength signals from the same input port to different optical switch units in the second-stage optical switching array 207. The second-stage optical switching array 207 and the second-stage grating 210 implement a "beam multiplexing" function.

The second-stage optical switching array 207 requires M×K switch switching units. The K switch units occupy spatial positions in an X direction, and K is a relatively large integer. As a result, optical switching cannot be implemented in two dimensions. Therefore, output ports are restricted in one dimension and cannot be arranged in two dimensions, each output port corresponds to the K optical switch units, and a quantity of the output ports is restricted.

SUMMARY

In view of this, embodiments of the present disclosure provide a WSS, a reconfigurable optical add/drop multiplexer, and a wavelength selection method in order to resolve a problem that output ports of a WSS cannot be arranged in two dimensions and a quantity of the output ports is restricted.

According to a first aspect, an embodiment of the present disclosure provides a WSS, including an input optical fiber collimation array, a first optical switching engine, a dispersion unit, an optical path converter, a second optical switching engine, a third optical switching engine, and an output optical fiber collimation array, where the input optical fiber collimation array is configured to input a first beam from a first port of the input optical fiber collimation array and make the first beam incident to the first optical switching engine. The first optical switching engine is configured to perform angle deflection on the first beam on a first plane according to a first preset angle such that the first beam is incident to the dispersion unit. The dispersion unit is configured to demultiplex, on a second plane, the first beam that is incident from the first optical switching engine, into multiple sub-wavelength beams, where the second plane and the first plane are orthogonal to each other. The optical path converter is configured to refract the multiple sub-wavelength beams that are obtained after the dispersion unit performs demultiplexing onto the second optical switching engine. The second optical switching engine is configured to perform, according to a second preset angle, angle deflection on the multiple sub-wavelength beams that are obtained after the dispersion unit performs demultiplexing such that the multiple sub-wavelength beams obtained by means of demultiplexing are incident to the dispersion unit using the optical path converter. The dispersion unit is further configured to multiplex, on the second plane, the angle-deflected multiple sub-wavelength beams that are obtained by means of demultiplexing, and make the multiplexed multiple sub-wavelength beams incident to the third optical switching engine, and the third optical switching engine is configured to perform angle deflection on the multiplexed multiple sub-wavelength beams on the first plane according to a third preset angle, and output the angle-deflected multiplexed multiple sub-wavelength beams from a second port of the output optical fiber collimation array.

With reference to the implementation of the first aspect, in a first possible implementation of the first aspect, the first port and the second port are ports that are arranged in two dimensions, and the first port and the second port are in different rows and/or columns.

With reference to the first aspect or the first possible implementation of the first aspect, in a second possible implementation of the first aspect, the input optical fiber collimation array and the output optical fiber collimation array are located in a same position on an optical axis, and the first optical switching engine and the third optical switching engine are located in a same position on the optical axis.

With reference to any one of the first aspect or the first and the second possible implementations of the first aspect, in a third possible implementation of the first aspect, a total quantity of first ports in the input optical fiber collimation array and second ports in the output optical fiber collimation array is P×Q, and the first optical switching engine and the third optical switching engine include a total of P×Q optical switching units that are arranged in two dimensions, where P and Q are integers greater than or equal to 1.

With reference to any one of the first aspect or the first to the third possible implementations of the first aspect, in a fourth possible implementation of the first aspect, the dispersion unit is located on a front focal plane of the optical path converter, and the second optical switching engine is located on a back focal plane of the optical path converter.

With reference to any one of the first aspect or the first to the fourth possible implementations of the first aspect, in a fifth possible implementation of the first aspect, the optical path converter includes a first optical path converter and a second optical path converter, the first optical path converter performs refraction on the first plane, and the second optical path converter performs refraction on the second plane.

With reference to any one of the first aspect or the first to the fifth possible implementations of the first aspect, in a sixth possible implementation of the first aspect, a beam expanding unit is further included between the first optical switching engine and the dispersion unit, and the beam expanding unit is configured to receive the first beam on which the first optical switching engine has performed angle deflection on the second plane, and expand the first beam on the second plane.

With reference to any one of the first aspect or the first to the sixth possible implementations of the first aspect, in a seventh possible implementation of the first aspect, the beam expanding unit includes a first lens, and the first optical path converter includes a second lens, the first beam on which the first optical switching engine has performed angle deflection on the second plane converges on a front focal plane of the first lens, the dispersion unit is located on a back focal plane of the first lens and on a front focal plane of the second lens, and the second optical switching engine is located on a back focal plane of the second lens.

With reference to any one of the first aspect or the first to the seventh possible implementations of the first aspect, in an eighth possible implementation of the first aspect, the beam expanding unit includes a third lens and a fourth lens, the first optical switching engine is located on a front focal plane of the third lens, the dispersion unit is located on a back focal plane of the fourth lens, and a distance between the third lens and the fourth lens is a sum of focal lengths of the third lens and the fourth lens.

With reference to any one of the first aspect or the first to the eighth possible implementations of the first aspect, in a ninth possible implementation of the first aspect, a polarization beam SP and a half-wave plate are further included between the input optical fiber collimation array and the first optical switching engine, the polarization beam SP is configured to split, on the second plane, the first beam from the first port of the input optical fiber collimation array into a first sub-beam and a second sub-beam, where the first sub-beam and the second sub-beam have polarization components that are orthogonal to each other. The polarization beam SP is further configured to multiplex, on the second plane, a third sub-beam that is incident from the half-wave plate to the polarization beam SP and a fourth sub-beam that is incident from the third optical switching engine to the polarization beam SP, into a beam, where the third sub-beam and the fourth sub-beam have polarization components that are orthogonal to each other, and a normal of an action plane of the half-wave plate is parallel to or coincides with propagation directions of the first sub-beam and the third sub-beam, the half-wave plate is configured to convert the first sub-beam into a beam that has a same orthogonal polarization component as an orthogonal polarization component of the first sub-beam, and the half-wave plate is further configured to convert the third sub-beam into a beam that has a same orthogonal polarization component as an orthogonal polarization component of the third sub-beam.

With reference to any one of the first aspect or the first to the ninth possible implementations of the first aspect, in a tenth possible implementation of the first aspect, central axes of the input optical fiber collimation array, the first optical switching engine, the dispersion unit, the optical path converter, the second optical switching engine, the third optical switching engine, and the output optical fiber collimation array are parallel to a direction of the optical axis.

According to a second aspect, an embodiment of the present disclosure provides a reconfigurable optical add/drop multiplexer ROADM, where the ROADM includes a first WSS, a second WSS, an add module, and a drop module, and the second WSS is the WSS according to any one of the first aspect or any possible implementation of the first aspect, and the first WSS is configured to receive an optical signal and demultiplex the received optical signal into at least two optical signals of different wavelengths, the second WSS is configured to perform wavelength switching on the at least two optical signals of different wavelengths on multiple input ports and multiple output ports, the add module is configured to upload a local wavelength signal to the multiple input ports of the second WSS, and the drop module is configured to download a local wavelength signal from the multiple output ports of the second WSS.

According to a third aspect, an embodiment of the present disclosure provides a wavelength selection method, where the method includes inputting, by an input optical fiber collimation array, a first beam from a first port, and making the first beam incident from the first port to a first optical switching engine, performing, by the first optical switching engine, angle deflection on the first beam on a first plane according to a first preset angle such that the first beam is incident to a dispersion unit, demultiplexing, by the dispersion unit, on a second plane, the first beam that is incident from the first optical switching engine, into multiple sub-wavelength beams, where the second plane and the first plane are orthogonal to each other, refracting, by an optical path converter, the multiple sub-wavelength beams that are obtained after the dispersion unit performs demultiplexing onto a second optical switching engine, performing, by the second optical switching engine according to a second preset angle, angle deflection on the multiple sub-wavelength beams that are obtained after the dispersion unit performs demultiplexing such that the multiple sub-wavelength beams obtained by means of demultiplexing are incident to the dispersion unit using the optical path converter, multiplexing, by the dispersion unit, on the second plane, the angle-deflected multiple sub-wavelength beams that are obtained by means of demultiplexing, and making the multiplexed multiple sub-wavelength beams incident to a third optical switching engine, and performing, by the third optical switching engine, angle deflection on the multiplexed multiple sub-wavelength beams on the first plane according to a third preset angle, and outputting the angle-deflected multiplexed multiple sub-wavelength beams from a second port of an output optical fiber collimation array.

With reference to the implementation of the third aspect, in a first possible implementation of the third aspect, the first port and the second port are ports that are arranged in two dimensions, and the first port and the second port are in different rows and/or columns.

With reference to the implementation of the third aspect or the first possible implementation of the third aspect, in a second possible implementation of the third aspect, the input optical fiber collimation array and the output optical fiber collimation array are located in a same position on an optical axis, and the first optical switching engine and the third optical switching engine are located in a same position on the optical axis.

With reference to any one of the implementation of the third aspect or the first to the second possible implementations of the third aspect, in a third possible implementation of the first aspect, a total quantity of first ports in the input optical fiber collimation array and second ports in the output optical fiber collimation array is P×Q, and the first optical switching engine and the third optical switching engine include a total of P×Q optical switching units that are arranged in two dimensions, where P and Q are integers greater than or equal to 1.

According to the technical solutions provided by the embodiments of the present disclosure, the first beam is input from the first port of the input optical fiber collimation array, and the first beam is incident to the first optical switching engine. The first optical switching engine performs angle deflection on the first beam on the first plane according to the first preset angle such that the first beam is incident to the dispersion unit. The dispersion unit demultiplexes, on the second plane, the first beam that is incident from the first optical switching engine, into multiple sub-wavelength beams. The optical path converter refracts the multiple sub-wavelength beams that are obtained after the dispersion unit performs demultiplexing onto the second optical switching engine. The second optical switching engine performs, according to the second preset angle, angle deflection on the multiple sub-wavelength beams that are obtained after the dispersion unit performs demultiplexing such that the multiple sub-wavelength beams obtained by means of demultiplexing are incident to the dispersion unit using the optical path converter. The dispersion unit multiplexes, on the second plane, the angle-deflected multiple sub-wavelength beams that are obtained by means of demultiplexing, and makes the multiplexed multiple sub-wavelength beams incident to the third optical switching engine, and the third optical switching engine performs angle deflection on the multiplexed multiple sub-wavelength beams on the first plane according to the third preset angle, and outputs the angle-deflected multiplexed multiple sub-wavelength beams from the second port of the output optical fiber collimation array. Optical switching in two dimensions is implemented on the first plane and the second plane, input ports and ports are arranged in two dimensions, and the input and output ports can reach a large scale in quantity.

BRIEF DESCRIPTION OF DRAWINGS

To describe the technical solutions in the embodiments of the present disclosure clearly, the following briefly describes the accompanying drawings required for describing the background and the embodiments. The accompanying drawings in the following description show merely some embodiments of the present disclosure, and a person of ordinary skill in the art may still derive other accompanying drawings or embodiments according to these drawings or description without creative efforts, and the present disclosure aims to cover all these derived accompanying drawings or embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
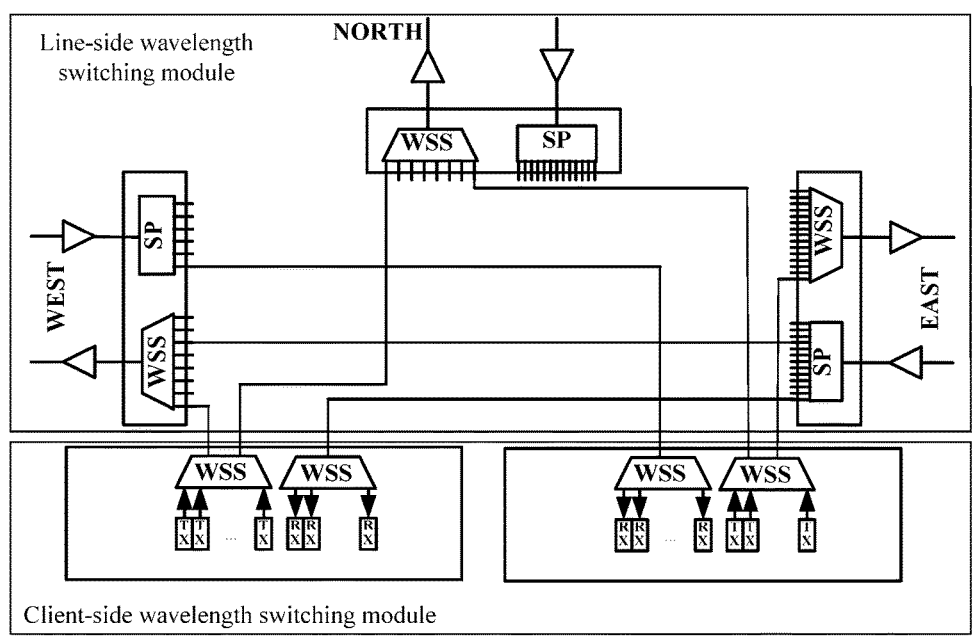
FIG. 1 is a schematic diagram of a reconfigurable optical add/drop multiplexer ROADM architecture.
Figure 2A:
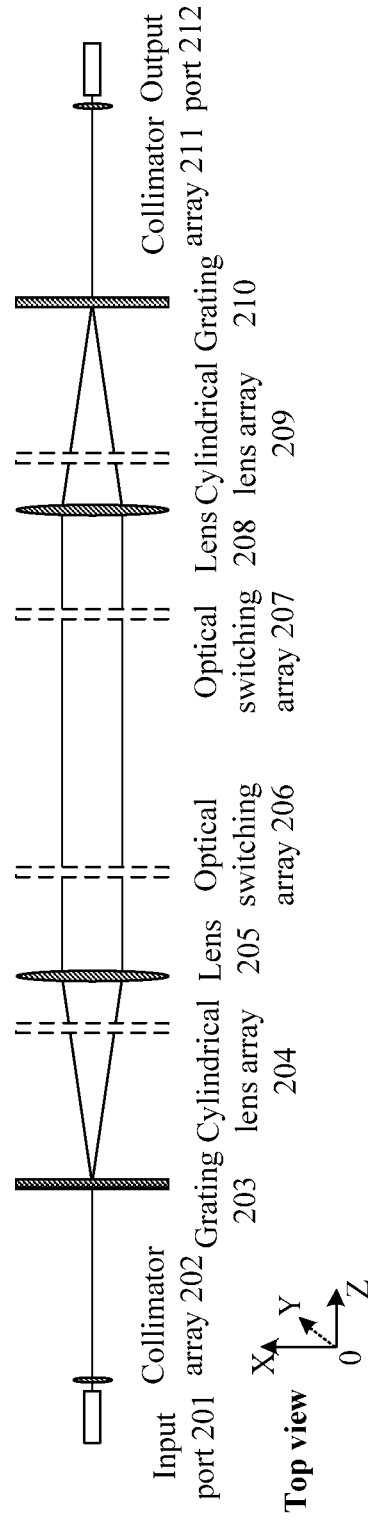
FIG. 2A is a schematic diagram of a top view of an optical path structure of an N×M WSS.
Figure 2B:
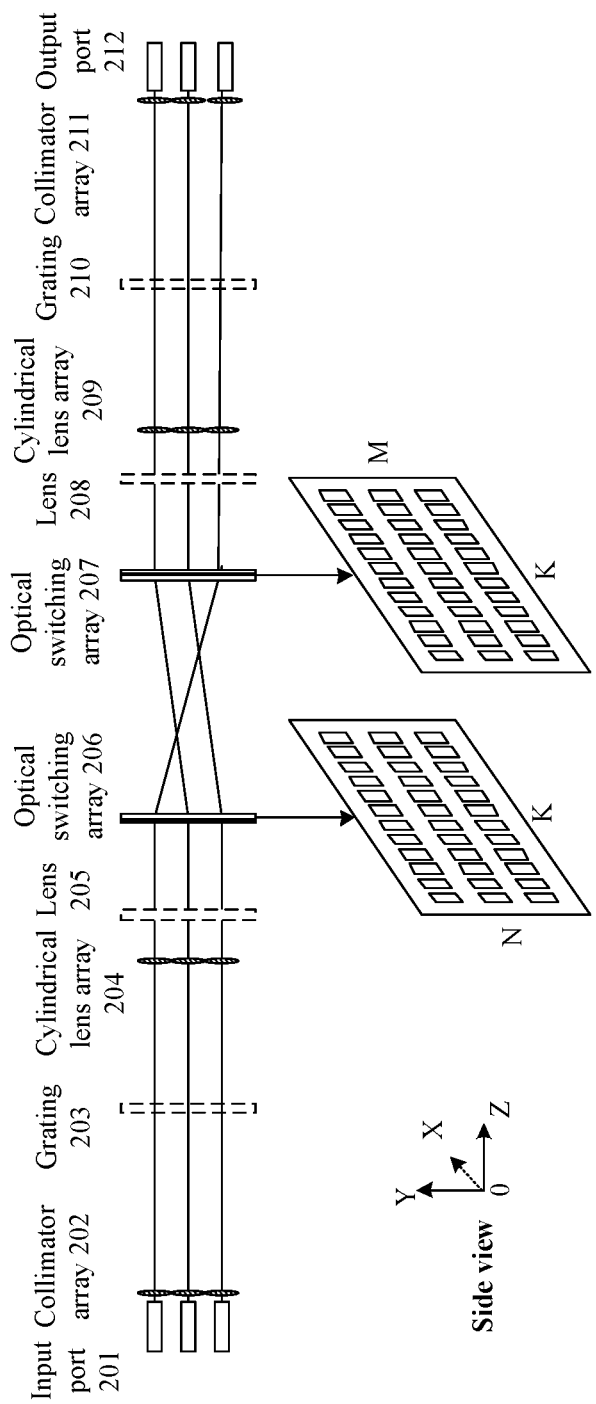
FIG. 2B is a schematic diagram of a side view of an optical path structure of an N×M WSS.
Figure 3:
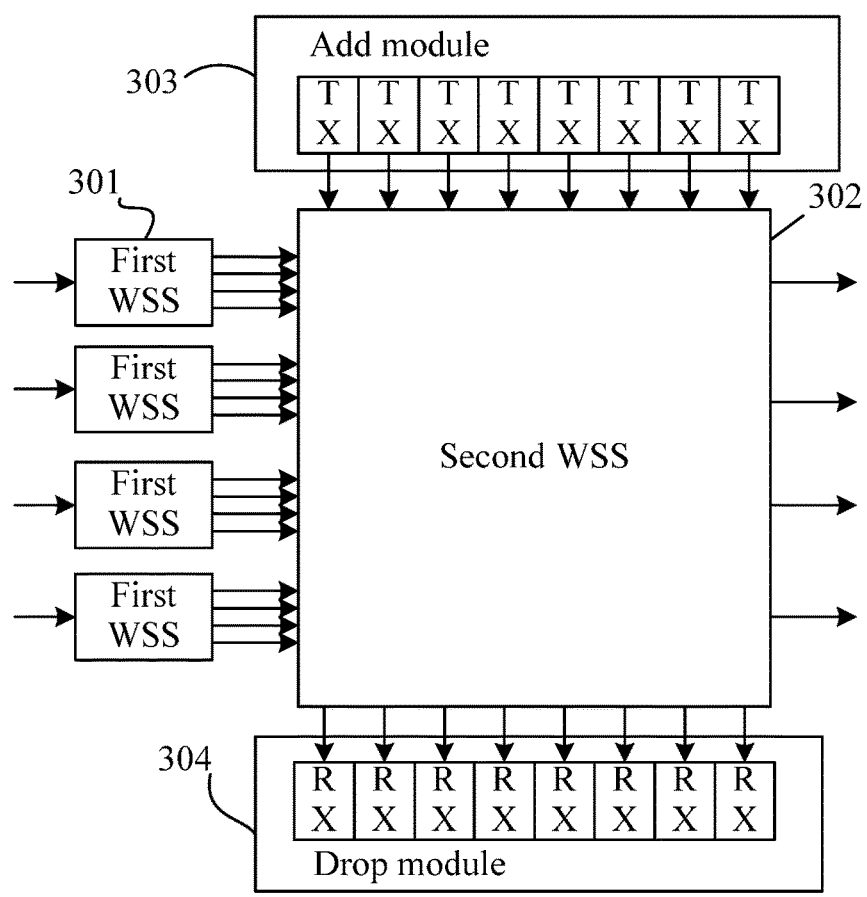
FIG. 3 is a schematic diagram of an ROADM architecture according to an embodiment of the present disclosure.

FIG. 3 is a schematic diagram of an ROADM architecture according to an embodiment of the present disclosure. As shown in FIG. 3, the ROADM architecture according to this embodiment of the present disclosure includes multiple first WSSs 301, a second WSS 302, an add module 303, and a drop module 304.

The first WSS 301 may be a 1×N WSS in the other approaches. The first WSS 301 is configured to receive a line-side wavelength signal and demultiplex the received wavelength signal into multiple signals of different wavelengths. The second WSS 302 is configured to implement beam multiplexing and beam demultiplexing functions, and perform wavelength selection and switching on an input port and an output port, to implement flexible wavelength scheduling in different directions. A structure of the second WSS 302 in this embodiment of the present disclosure is different from a structure of the first WSS 301. The specific structure of the second WSS 302 is described in detail in the following embodiments. The add module 303 includes multiple transmitters (designated as TX) and is configured to upload a client-side local wavelength signal to an input port of the second WSS 302. The drop module 304 includes multiple receivers (designated as RX) and is configured to download a client-side local wavelength signal from an output port of the second WSS 302.

Figure 4A:
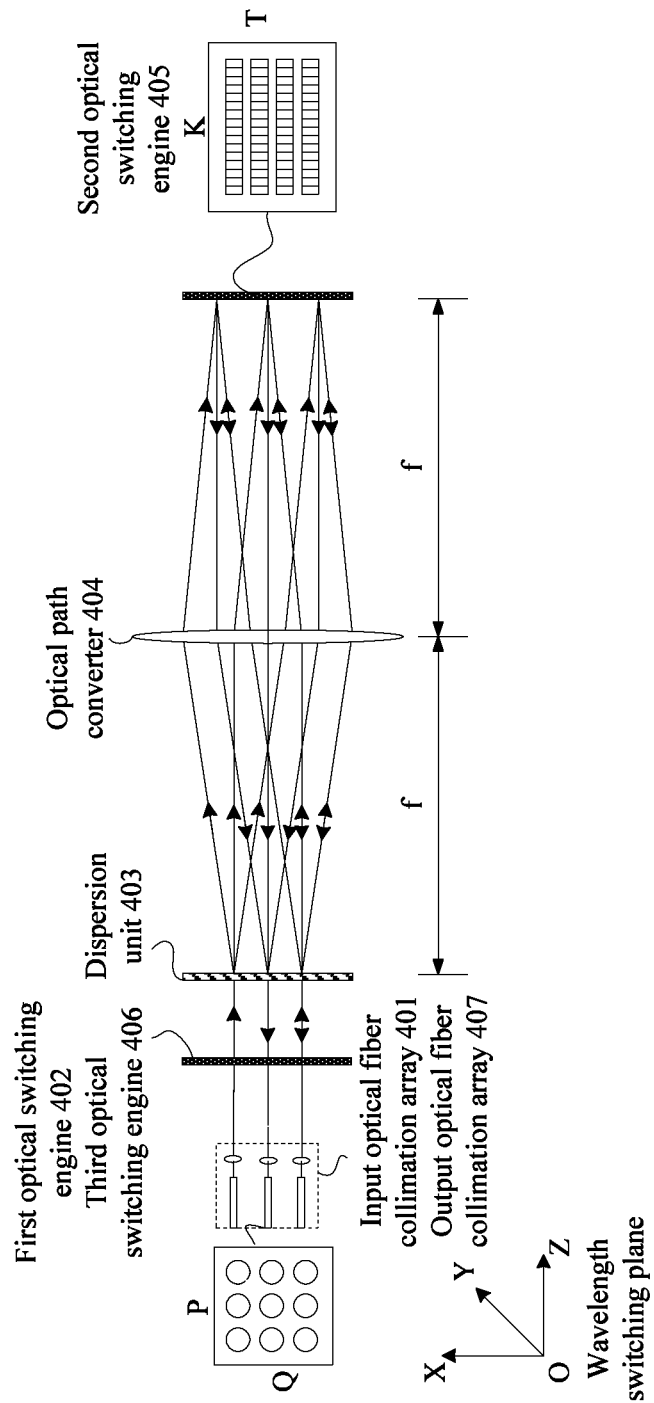
FIG. 4A is a schematic diagram of an optical path structure of a WSS on a wavelength switching plane according to an embodiment of the present disclosure.
Figure 4B:
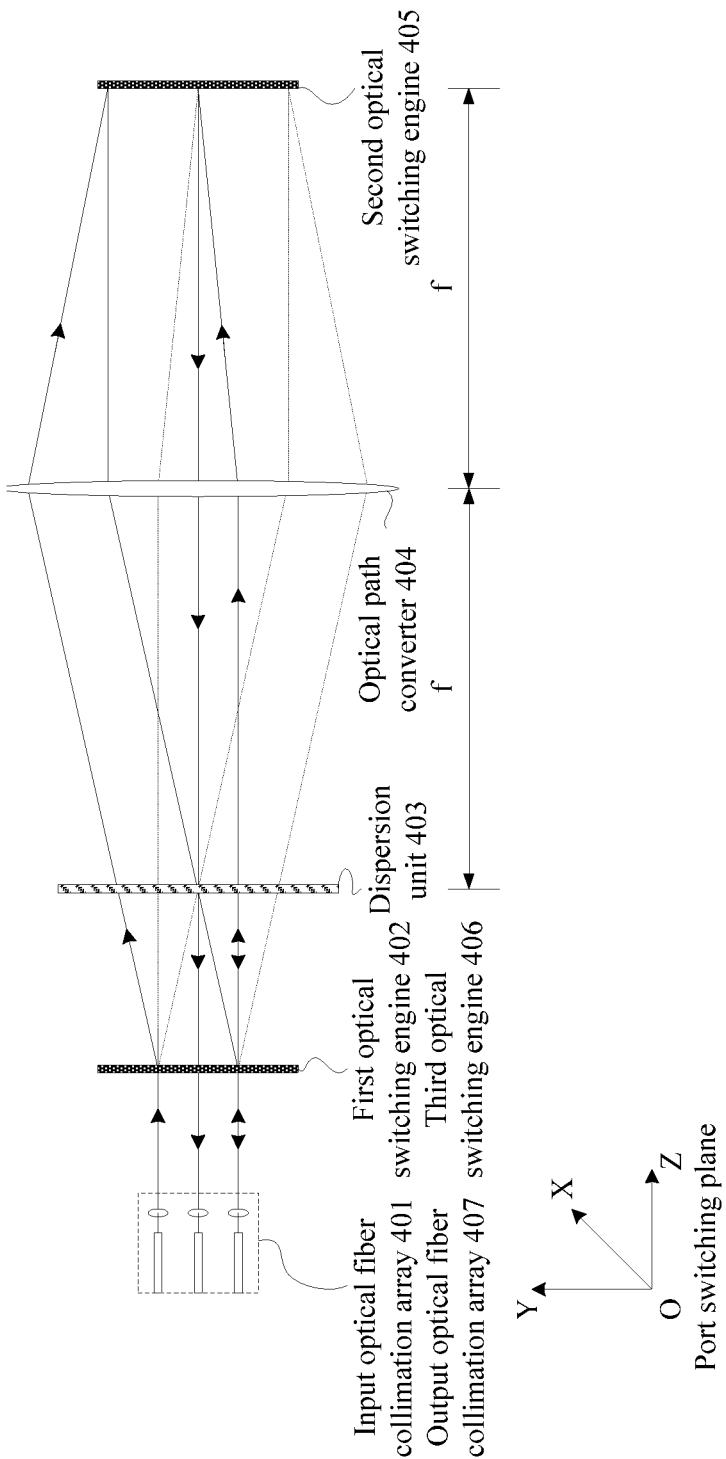
FIG. 4B is a schematic diagram of an optical path structure of a WSS on a port switching plane according to an embodiment of the present disclosure.

FIG. 4A is a schematic diagram of an optical path structure of a WSS on a wavelength switching plane according to an embodiment of the present disclosure. FIG. 4B is a schematic diagram of an optical path structure of a WSS on a port switching plane according to an embodiment of the present disclosure. The wavelength switching plane is an XOZ plane, and the port switching plane is a YOZ plane. Further, as shown in FIG. 4A and FIG. 4B, the WSS includes an input optical fiber collimation array 401, a first optical switching engine 402, a dispersion unit 403, an optical path converter 404, a second optical switching engine 405, a third optical switching engine 406, and an output optical fiber collimation array 407. An overall optical path is symmetrically distributed around the second optical switching engine 405 as a center. The first optical switching engine 402 and the third optical switching engine 406 may be disposed in a same position on an optical axis, and the input optical fiber collimation array 401 and the output optical fiber collimation array 407 may also be disposed in a same position on the optical axis. The optical axis is an axis of symmetry of an optical system, that is, a Z-axis direction in FIG. 4A and FIG. 4B.

In a specific implementation process, the input optical fiber collimation array 401 is configured to input a first beam from a first port of the input optical fiber collimation array 401 and make the first beam incident to the first optical switching engine 402. The first optical switching engine 402 is configured to perform angle deflection on the first beam on a first plane according to a first preset angle such that the first beam is incident to the dispersion unit 403. The dispersion unit 403 is configured to demultiplex, on a second plane, the first beam that is incident from the first optical switching engine 402, into multiple sub-wavelength beams, where the second plane and the first plane are orthogonal to each other. The optical path converter 404 is configured to refract the multiple sub-wavelength beams that are obtained after the dispersion unit 403 performs demultiplexing onto the second optical switching engine 405. The second optical switching engine 405 is configured to perform, according to a second preset angle, angle deflection on the multiple sub-wavelength beams that are obtained after the dispersion unit 403 performs demultiplexing such that the multiple sub-wavelength beams obtained by means of demultiplexing are incident to the dispersion unit 403 using the optical path converter 404. The dispersion unit 403 is further configured to multiplex, on the second plane, the angle-deflected multiple sub-wavelength beams that are obtained by means of demultiplexing, and make the multiplexed multiple sub-wavelength beams incident to the third optical switching engine 406, and the third optical switching engine 406 is configured to perform angle deflection on the multiplexed multiple sub-wavelength beams on the first plane according to a third preset angle, and output the angle-deflected multiplexed multiple sub-wavelength beams from a second port of the output optical fiber collimation array 407. The first plane may be the port switching plane, and the second plane may be the wavelength switching plane. The first beam may be a collimated beam, that is, a parallel beam. The first port and the second port may be multiple ports that are arranged in two dimensions, and the first port and the second port may be located in a same row but different columns, in a same column but different rows, or may be located in different rows and different columns.

The input optical fiber collimation array 401 and the output optical fiber collimation array 407 include an optical fiber array and a collimator array, and input ports in the input optical fiber collimation array 401 and output ports in the output optical fiber collimation array 407 may be P△Q ports that are arranged in two dimensions, where both P and Q are integers greater than or equal to 1. Any port of the input optical fiber collimation array 401 and the output optical fiber collimation array 407 may be used as an input port or an output port, or may be used as both an input port and an output port. In this embodiment, the first port is an input port, and the second port is an output port.

The first optical switching engine 402, the second optical switching engine 405, and the third optical switching engine 406 include but are not limited to an optical switching engine such as an Micro-Electro-Mechanical System (MEMS), a Liquid Crystal on Silicon (LCOS), or Digital Light Processing (DLP). Multiple optical switching units are in an optical switching engine and are configured to deflect and adjust a direction of a beam. On the wavelength switching plane, the first optical switching engine 402 and the third optical switching engine 406 may not perform angle deflection on a beam. For example, after passing through the first optical switching engine 402, the collimated beam output by the input optical fiber collimation array 401 is incident to the dispersion unit 403 in a parallel manner, and the third optical switching engine 406 receives multiple sub-wavelength beams multiplexed by the dispersion unit 403 such that the multiplexed multiple sub-wavelength beams are incident to the output optical fiber collimation array 407 in a parallel manner for output. On the port switching plane, the first optical switching engine 402 and the third optical switching engine 406 may perform angle deflection on a beam. For example, the first optical switching engine 402 receives a collimated beam from the input optical fiber collimation array 401, and performs angle deflection on the collimated beam according to the first preset angle to form a first deflected beam, and the third optical switching engine 406 performs angle deflection on multiplexed multiple sub-wavelength beams according to the third preset angle to form a third deflected beam such that the third deflected beam is incident to the output optical fiber collimation array 407 in a parallel manner for output. The second optical switching engine 405 is configured to perform, on both the wavelength switching plane and the port switching plane, angle deflection on a beam. On the wavelength switching plane, the second optical switching engine 405 is configured to perform, according to the second preset angle, angle deflection on the multiple sub-wavelength beams that are obtained after the dispersion unit 403 performs demultiplexing, and a formed second deflected beam is incident to different positions in the dispersion unit 403 after being refracted by the optical path converter 404. On the port switching plane, the second optical switching engine 405 performs angle deflection on the first deflected beam according to the second preset angle, and a formed second deflected beam is refracted onto different positions in the third optical switching engine 406 using the optical path converter 404.

Further, that the first optical switching engine 402, the second optical switching engine 405, and the third optical switching engine 406 each perform angle deflection on a propagation direction of a beam may be implemented by controlling a voltage of the optical switching engine. For example, for an LCOS, a voltage of the LCOS is controlled such that a refractive index of the liquid crystal changes and a phase difference is generated. In this case, the direction of the beam changes when the beam passes through an optical switching unit in the LCOS. Further, the first preset angle may be obtained by performing calculation according to a distance between the first optical switching engine 402 and the second optical switching engine 405 and a position of the first deflected beam in the second optical switching engine 405. The second preset angle may be obtained by performing calculation according to a distance between the second optical switching engine 405 and the dispersion unit 403 and a position that is in the dispersion unit 403 and to which the second deflected beam is incident after passing through the optical path converter 404, and the second preset angle may alternatively be obtained by performing calculation according to a distance between the second optical switching engine 405 and the third optical switching engine 406 and a position of the second deflected beam in the third optical switching engine 406, and the third preset angle may be set according to an angle at which the third deflected beam is made incident from the third optical switching engine 406 to the output optical fiber collimation array 407 in a parallel manner.

The first optical switching engine 402 and the third optical switching engine 406 are located in the same position on the optical axis, may be different optical switching units in a same optical switching engine, or may be different optical switching engines. Further, the first optical switching engine 402 and the third optical switching engine 406 may include M$\Delta$N optical switching units that are arranged in two dimensions, where M is greater than or equal to P, and N is greater than or equal to Q. When M is equal to P and N is equal to Q, the optical switching units in the first optical switching engine 402 and the third optical switching engine 406 correspond to ports in the input optical fiber collimation array 401 and ports in the output optical fiber collimation array 407 in a one-to-one manner, respectively. The second optical switching engine 405 may include T×K optical switching units, where all of M, N, T, and K are integers greater than or equal to 1, and K is a maximum quantity of sub-wavelengths that are obtained after the dispersion unit 403 performs demultiplexing.

The dispersion unit 403 is a reflection grating, a transmission grating, or a dispersion prism. Optionally, to increase a dispersion effect, a combination of multiple gratings may be used, or an optical path may be adjusted to make a beam pass through a same grating for multiple times. The dispersion unit 403 mainly performs beam demultiplexing and beam multiplexing on the wavelength switching plane. On the port switching plane, the dispersion unit 403 does not perform beam multiplexing or beam demultiplexing. In a beam incident direction (that is, a direction from the input optical fiber collimation array 401 to the second optical switching engine 405), the dispersion unit 403 is configured to receive the first deflected beam that is obtained after the first optical switching engine 402 performs deflection, and transmit the first deflected beam to the optical path converter 404, and in a beam emergent direction (that is, a direction from the second optical switching engine 405 to the output optical fiber collimation array 407), the dispersion unit 403 is configured to transmit the second deflected beam to the third optical switching engine 406.

The optical path converter 404 may be a single lens or a lens group that includes multiple lenses. The single lens may be a convex lens or a concave mirror. The lens group may include multiple convex lenses and/or concave mirrors. Further, the single lens or the lens group forms a 2f system, where f is a focal length of a lens. The single lens is used as an example. The dispersion unit 403 and the second optical switching engine 405 are located on a front focal plane and a back focal plane of the lens, respectively. According to an imaging principle of geometrical optics, beams that are emitted at different angles from a same position on a focal plane (for example, a front focal plane) are incident to different positions on an image plane (for example, the second optical switching engine 405) in a parallel manner after passing through the optical path converter 404, and beams that are emitted at a same angle from different positions on a focal plane are incident to a same position on an image plane at different angles after passing through the optical path converter 404. On the wavelength switching plane, sub-wavelength beams that are diffracted according to different angles from a same position in the dispersion unit 403 are emitted in a parallel manner after being refracted by the optical path converter 404, are incident to the second optical switching engine 405 at a same angle, and are incident to different positions in the second optical switching engine 405 according to different wavelength values, and on the wavelength switching plane, sub-wavelength beams that are diffracted at a same angle from different positions in the dispersion unit 403 are incident to a same position in the second optical switching engine 405 at different angles after being refracted by the optical path converter 404. On the wavelength switching plane, the second optical switching engine 405 reflects the multiple sub-wavelength beams according to the second preset angle, and after the formed second deflected beam is refracted by the optical path converter 404, each sub-wavelength beam of the second deflected beam returns to the dispersion unit 403 according to an original emergence angle. On the port switching plane, first deflected beams that are incident from different ports are incident to different positions in the second optical switching engine 405 after being refracted by the optical path converter 404 according to different angles. The second optical switching engine 405 performs angle deflection on the first deflected beam according to the second preset angle, the formed second deflected beam is reflected to the optical path converter 404, and the second deflected beam returns to the third optical switching engine 406 according to an original incidence angle after being refracted by the optical path converter 404.

In the embodiments of the present disclosure, the first beam is input from the first port of the input optical fiber collimation array 401, and the first beam is incident to the first optical switching engine 402. The first optical switching engine 402 performs angle deflection on the first beam on the first plane according to the first preset angle such that the first beam is incident to the dispersion unit 403. The dispersion unit 403 demultiplexes, on the second plane, the first beam that is incident from the first optical switching engine 402, into multiple sub-wavelength beams. The optical path converter 404 refracts the multiple sub-wavelength beams that are obtained after the dispersion unit 403 performs demultiplexing onto the second optical switching engine 405. The second optical switching engine 405 performs, according to the second preset angle, angle deflection on the multiple sub-wavelength beams that are obtained after the dispersion unit 403 performs demultiplexing such that the multiple sub-wavelength beams obtained by means of demultiplexing are incident to the dispersion unit 403 using the optical path converter 404. The dispersion unit 403 multiplexes, on the second plane, the angle-deflected multiple sub-wavelength beams that are obtained by means of demultiplexing, and makes the multiplexed multiple sub-wavelength beams incident to the third optical switching engine 406, and the third optical switching engine 406 performs angle deflection on the multiplexed multiple sub-wavelength beams on the first plane according to the third preset angle, and outputs the angle-deflected multiplexed multiple sub-wavelength beams from the second port of the output optical fiber collimation array 407. In the embodiments of the present disclosure, optical switching in two dimensions is implemented on the wavelength switching plane and the port switching plane, input and output ports are arranged in two dimensions, and the ports can reach a large scale in quantity. In addition, the input and output ports can be switched to each other. Therefore, flexibility of WSS applications can be improved, and a single-fiber bidirectional application scenario can be supported.

Figure 5A:
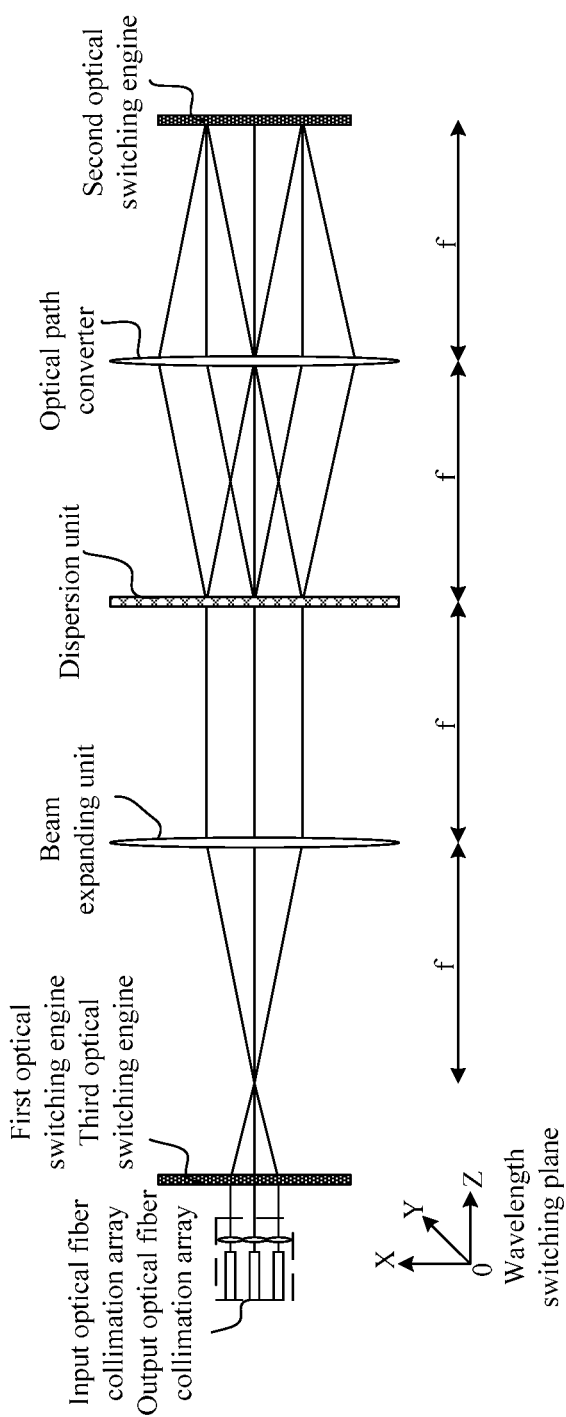
FIG. 5A is a schematic diagram of an optical path structure of another WSS on a wavelength switching plane according to an embodiment of the present disclosure.
Figure 5B:
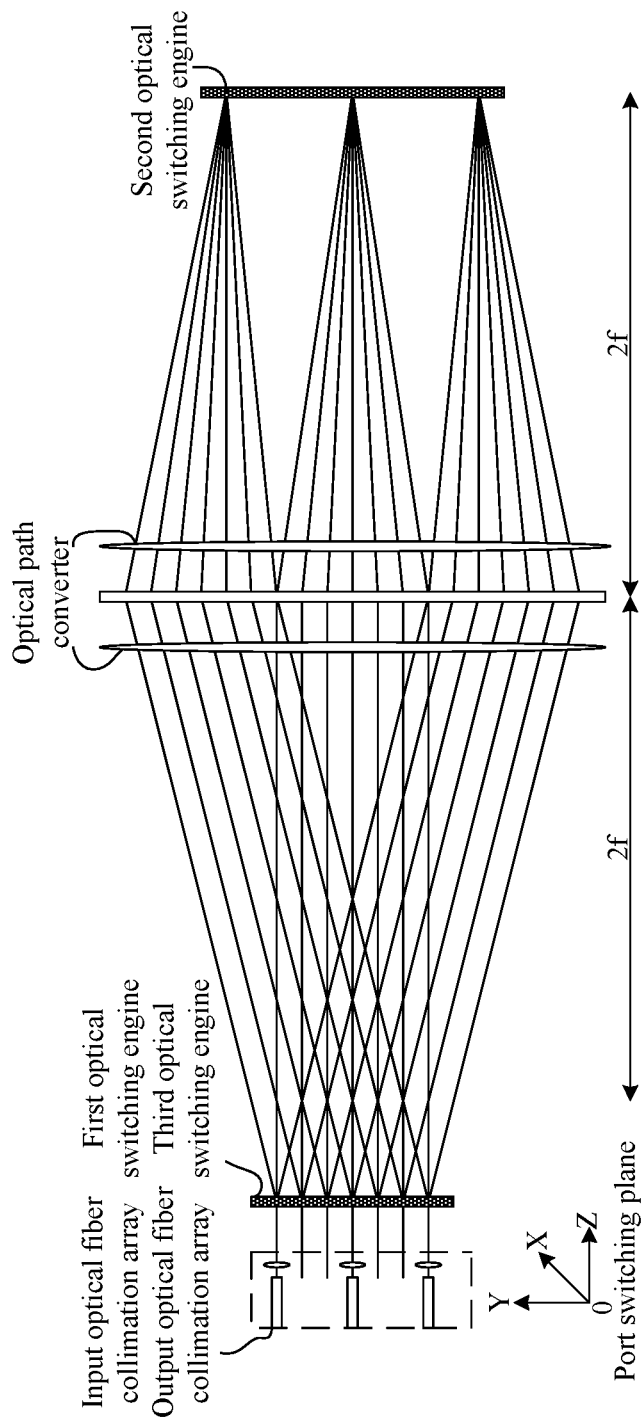
FIG. 5B is a schematic diagram of an optical path structure of another WSS on a port switching plane according to an embodiment of the present disclosure.
Figure 6A:
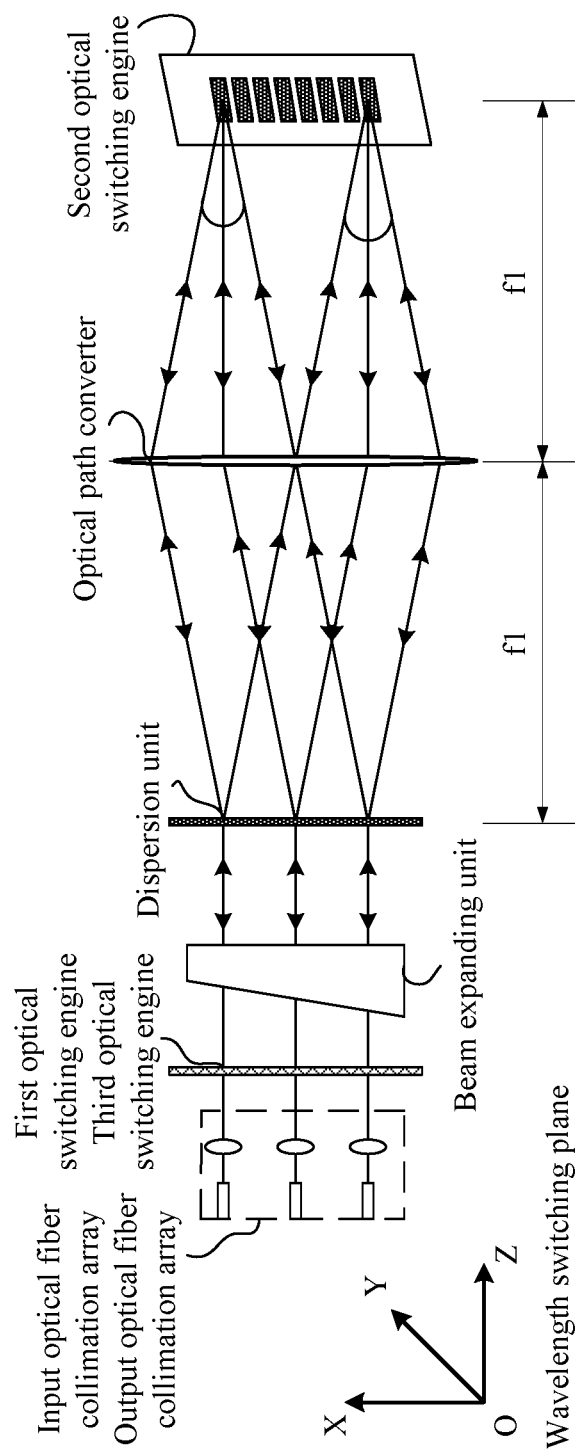
FIG. 6A is a schematic diagram of an optical path structure of still another WSS on a wavelength switching plane according to an embodiment of the present disclosure.
Figure 6B:
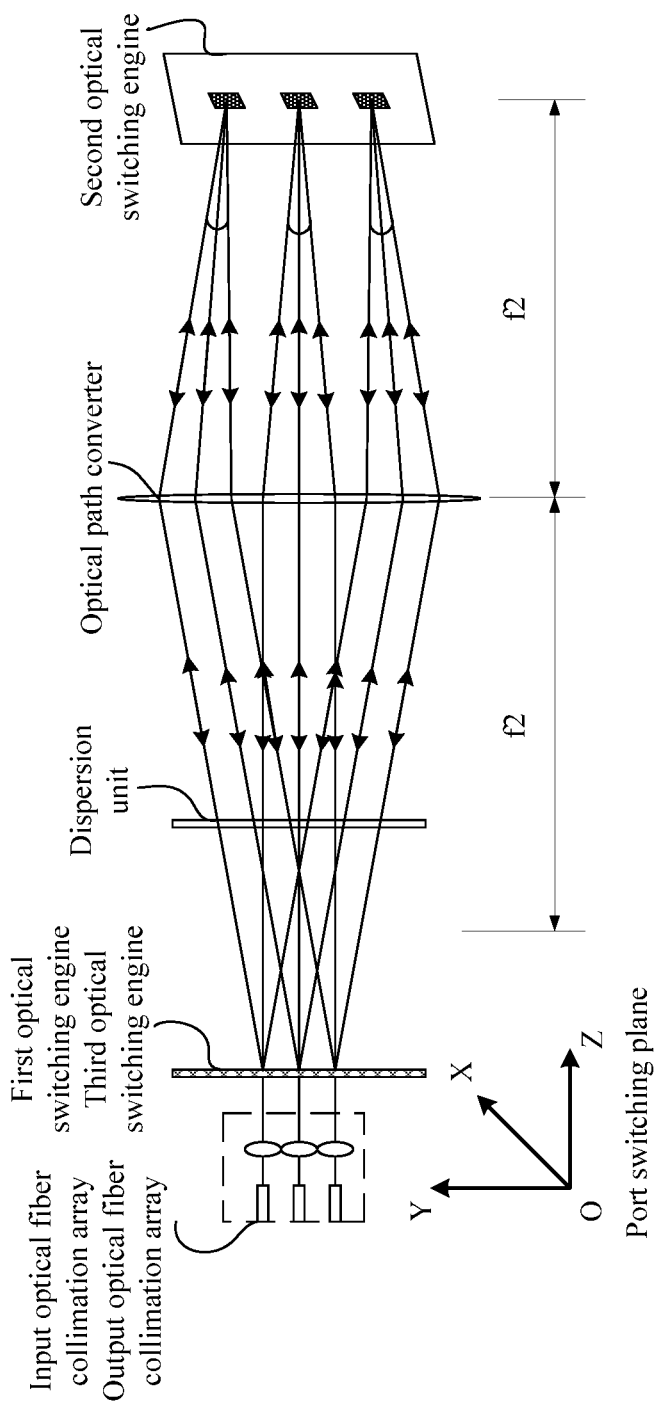
FIG. 6B is a schematic diagram of an optical path structure of still another WSS on a port switching plane according to an embodiment of the present disclosure.

FIG. 5A is a schematic diagram of an optical path structure of another WSS on a wavelength switching plane according to an embodiment of the present disclosure. FIG. 5B is a schematic diagram of an optical path structure of another WSS on a port switching plane according to an embodiment of the present disclosure. FIG. 6A is a schematic diagram of an optical path structure of still another WSS on a wavelength switching plane according to an embodiment of the present disclosure. FIG. 6B is a schematic diagram of an optical path structure of still another WSS on a port switching plane according to an embodiment of the present disclosure. The wavelength switching plane is an XOZ plane, and the port switching plane is a YOZ plane. Further, differences between the embodiments shown in FIG. 5A, FIG. 5B, FIG. 6A, and FIG. 6B and the embodiments shown in FIG. 4A and FIG. 4B are as follows.

1. A beam expanding unit is added between a first optical switching engine (or a third optical switching engine) and a dispersion unit, and configured to expand a collimated beam generated by an input optical fiber collimation array and increase a size of a light spot on the dispersion unit, where on the wavelength switching plane, the beam expanding unit may expand the collimated beam, and on the port switching plane, the beam expanding unit may not have any effect on the collimated beam, and therefore is not shown in the FIGS. 5B and 6B.

2. An optical path converter includes a first optical path converter and a second optical path converter, where the first optical path converter performs, on the wavelength switching plane, refraction on multiple sub-wavelength beams that are obtained after the dispersion unit performs demultiplexing, and the second optical path converter performs, on the port switching plane, refraction on a first deflected beam that is obtained after the first optical switching engine performs angle deflection and a second deflected beam that is obtained after a second optical switching engine performs angle deflection.

Further, as shown in FIG. 5A, the beam expanding unit may be a single lens or a lens group that includes multiple lenses. The beam expanding unit may be a first lens, the first optical path converter may be a second lens, focal lengths of the first lens and the second lens may be the same, and the first lens and the second lens form a 4f system, where f is a focal length of a lens. On the wavelength switching plane, the first optical switching engine performs angle deflection on the collimated beam output by the input optical fiber collimation array to generate a converged beam, and a beam convergence point is located on a front focal plane of the first lens. The dispersion unit is located on a back focal plane of the first lens and a front focal plane of the second lens. The second optical switching engine is located on a back focal plane of the second lens. As shown in FIG. 6A, the beam expanding unit may alternatively be a single prism or a prism group that includes multiple prisms. On the wavelength switching plane, after the collimated beam output by the input optical fiber collimation array passes through the first optical switching engine, the single prism or the prism group expands the collimated beam.

Because the first optical path converter performs refraction on the wavelength switching plane and the second optical path converter performs refraction on the port switching plane, the first optical path converter and the second optical path converter may use a cylindrical lens. FIG. 5A and FIG. 6A show only the first optical path converter, and FIG. 5B and FIG. 6B show only the second optical path converter. As shown in FIG. 5A and FIG. 5B, the first optical path converter may include a single cylindrical lens or a cylindrical lens group that includes multiple cylindrical lenses, and the second optical path converter may include two cylindrical lenses or two cylindrical lens groups that each include multiple cylindrical lenses. The dispersion unit is located on a front focal plane of the first optical path converter, and the second optical switching engine is located on a back focal plane of the first optical path converter. The second optical path converter may be equivalent to an optical path converter that is in a same position as the dispersion unit. As shown in FIG. 6A and FIG. 6B, the first optical path converter may include a first cylindrical lens, and the second optical path converter may include a second cylindrical lens. Focal lengths of the first cylindrical lens and the second cylindrical lens may be different. The dispersion unit is located on a front focal plane of the first cylindrical lens, and the second optical switching engine is located on a back focal plane of the first cylindrical lens. A front focal plane of the second cylindrical lens is in a particular position between the first optical switching engine (or the third optical switching engine) and the dispersion unit. The particular position is a waist position of an input beam collimated by the input optical fiber collimation array. The second optical switching engine is located on a back focal plane of the second cylindrical lens.

In the embodiments of the present disclosure, the beam expanding unit is added in the WSS, an area of a light spot of a collimated beam on the dispersion unit is increased, and a dispersion effect of the dispersion unit is enhanced, thereby implementing optical wavelength switching on the wavelength switching plane.

Figure 7A:
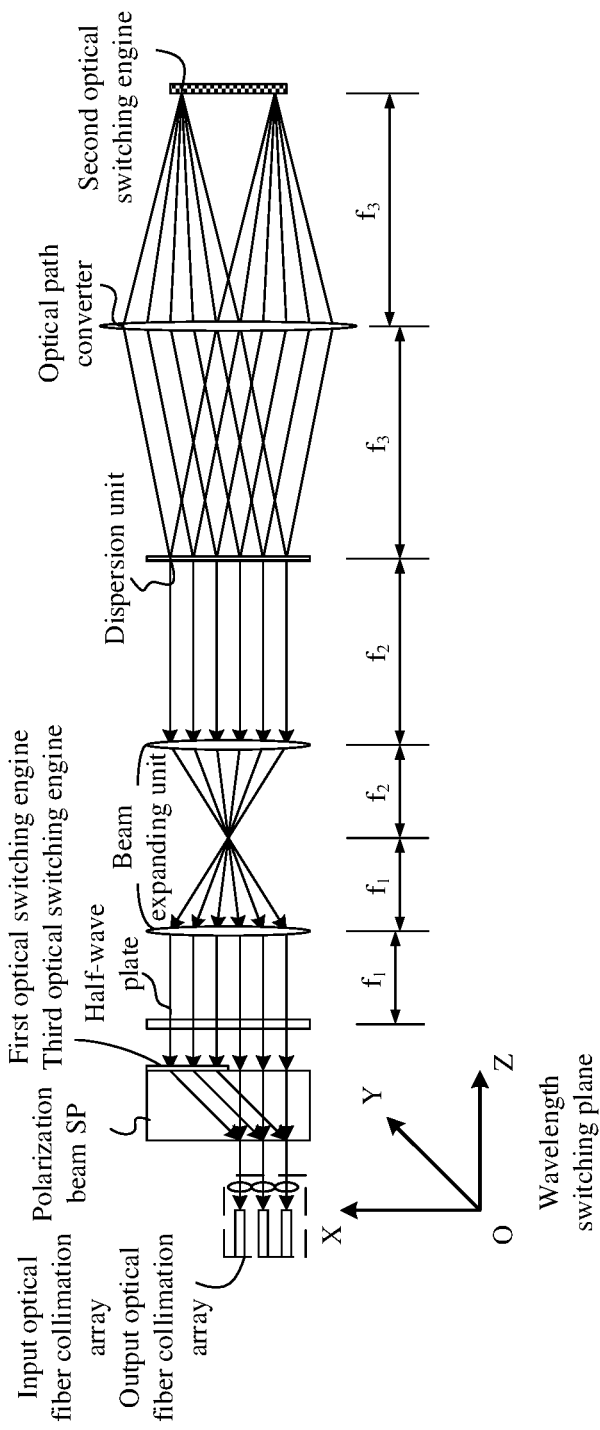
FIG. 7A is a schematic diagram of an optical path structure of a WSS on a wavelength switching plane according to an embodiment of the present disclosure.
Figure 7B:
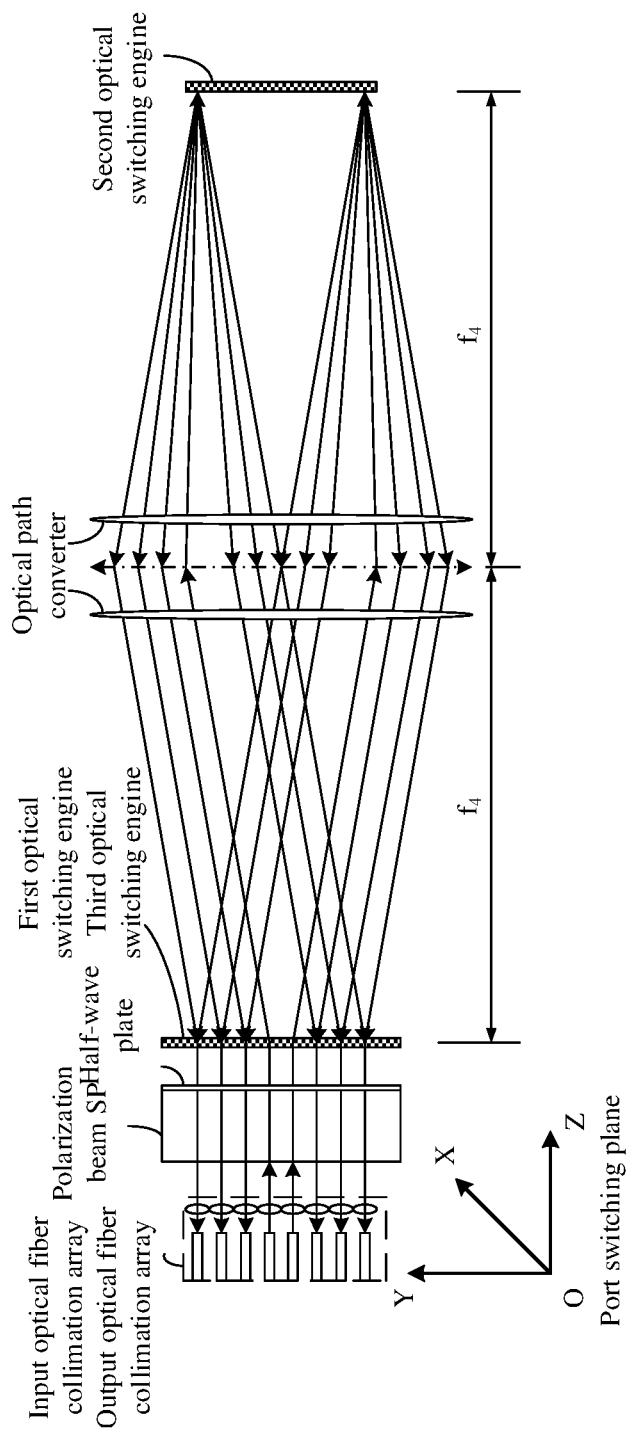
FIG. 7B is a schematic diagram of an optical path structure of a WSS on a port switching plane according to an embodiment of the present disclosure.

FIG. 7A is a schematic diagram of an optical path structure of a WSS on a wavelength switching plane according to an embodiment of the present disclosure. FIG. 7B is a schematic diagram of an optical path structure of a WSS on a port switching plane according to an embodiment of the present disclosure. The wavelength switching plane is an XOZ plane, and the port switching plane is a YOZ plane. Further, a difference between the embodiments shown in FIG. 7A and FIG. 7B and the embodiments shown in FIG. 5A and FIG. 5B is as follows. A polarization beam SP and a half-wave plate are added between an input optical fiber collimation array (or an output optical fiber collimation array) and a first optical switching engine (or a third optical switching engine), where on the wavelength switching plane, a normal of an action plane of the half-wave plate is parallel to or coincides with a propagation direction of a beam that passes through the half-wave plate.

Further, the polarization beam SP and the half-wave plate may have an effect only on the wavelength switching plane, and may not have an effect on the port switching plane. On the wavelength switching plane, in a beam incident direction (that is, a direction from the input optical fiber collimation array to a second optical switching engine), the polarization beam SP is configured to split a first beam that is input from a first port of the input optical fiber collimation array into a first sub-beam and a second sub-beam, where the first sub-beam and the second sub-beam have polarization components that are orthogonal to each other. The half-wave plate converts the first sub-beam into a beam that has a same orthogonal polarization component as an orthogonal polarization component of the first sub-beam, or the half-wave plate converts the second sub-beam into a parallel beam that has a same orthogonal polarization component as an orthogonal polarization component of the second sub-beam. In this case, the first sub-beam and the second sub-beam have polarization components that are in a same direction. In a beam emergent direction (that is, a direction from the second optical switching engine to the output optical fiber collimation array), the polarization beam SP is further configured to multiplex a third sub-beam that is incident from the half-wave plate to the polarization beam SP and a fourth sub-beam that is incident from the third optical switching engine to the polarization beam SP, into a beam, where the third sub-beam and the fourth sub-beam have polarization components that are orthogonal to each other. Before the polarization beam SP multiplexes the third sub-beam and the fourth sub-beam into the beam, the half-wave plate converts the third sub-beam into a beam that has a same orthogonal polarization component as an orthogonal polarization component of the third sub-beam.

Further, as shown in FIG. 7A, a beam expanding unit may include two lenses, including a first lens and a second lens, and is configured to expand, on the wavelength switching plane, a collimated beam generated by the input optical fiber collimation array, and increase a size of a light spot on a dispersion unit. Focal lengths of the first lens and the second lens may be different and may be f1 and f2, respectively. The first optical switching engine (the third optical switching engine) is disposed on a front focal plane of the first lens, and the dispersion unit is disposed on a back focal plane of the second lens. An interval between the first lens and the second lens is a sum of f1 and f2. After the collimated beam output by the input optical fiber collimation array passes through the polarization beam SP, two parallel beams whose polarization components are orthogonal to each other are generated. A parallel beam with one polarization component passes through the half-wave plate, and a parallel beam with the other polarization component is directly transmitted from the polarization beam SP. In this case, the two parallel beams have polarization components that are in a same direction. The two parallel beams are incident to the first lens after passing through the first optical switching engine, and converge on a back focal plane of the first lens and a front focal plane of the second lens. After the converged beam is diverged by the second lens, new parallel beams are formed.

In a specific implementation process, a first optical path converter performs refraction on the wavelength switching plane, a second optical path converter performs refraction on the port switching plane, and the first optical path converter and the second optical path converter may use a cylindrical lens. FIG. 7A shows only the first optical path converter, and FIG. 7B shows only the second optical path converter. A focal length of the first optical path converter is f3. The focal lengths of the first lens and the second lens in the beam expanding unit are f1 and f2, respectively. The second optical path converter may be an equivalent lens that includes two cylindrical lenses, and a focal length of the equivalent lens may be $f_4=f_1+f_2+f_3$.

In the embodiments of the present disclosure, the polarization beam SP and the half-wave plate are added in the WSS, implementing optical switching of an input collimated beam in different polarization directions.

Figure 8:
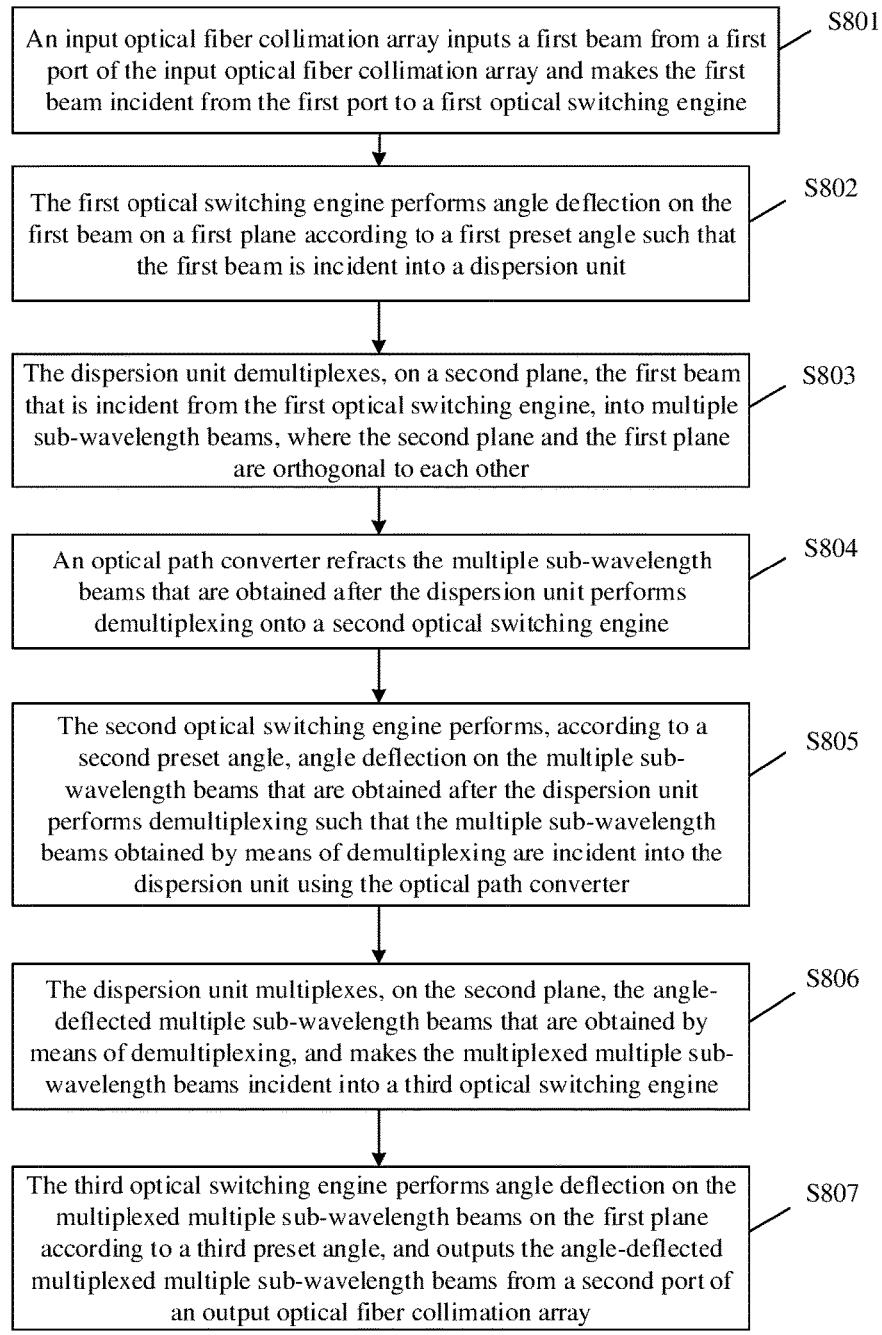
FIG. 8 is a flowchart of a wavelength selection method according to an embodiment of the present disclosure.

FIG. 8 is an example of a flowchart of a wavelength selection method according to an embodiment of the present disclosure. The method may be executed by a WSS and includes the following steps.

Step S801: An input optical fiber collimation array inputs a first beam from a first port of the input optical fiber collimation array and makes the first beam incident from the first port to a first optical switching engine.

Step S802: The first optical switching engine performs angle deflection on the first beam on a first plane according to a first preset angle such that the first beam is incident into a dispersion unit.

Step S803: The dispersion unit demultiplexes, on a second plane, the first beam that is incident from the first optical switching engine, into multiple sub-wavelength beams, where the second plane and the first plane are orthogonal to each other.

Step S804: An optical path converter refracts the multiple sub-wavelength beams that are obtained after the dispersion unit performs demultiplexing onto a second optical switching engine.

Step S805: The second optical switching engine performs, according to a second preset angle, angle deflection on the multiple sub-wavelength beams that are obtained after the dispersion unit performs demultiplexing such that the multiple sub-wavelength beams obtained by means of demultiplexing are incident to the dispersion unit using the optical path converter.

Step S806: The dispersion unit multiplexes, on the second plane, the angle-deflected multiple sub-wavelength beams that are obtained by means of demultiplexing, and makes the multiplexed multiple sub-wavelength beams incident to a third optical switching engine.

Step S807: The third optical switching engine performs angle deflection on the multiplexed multiple sub-wavelength beams on the first plane according to a third preset angle, and outputs the angle-deflected multiplexed multiple sub-wavelength beams from a second port of an output optical fiber collimation array.

In a specific implementation process, the first plane may be a port switching plane, and the second plane may be a wavelength switching plane. The first port and the second port are ports that are arranged in two dimensions, and may be located in different rows but a same column, in a same row but different columns, or in different rows and different columns. A total quantity of first ports and second ports may be P×Q. The input optical fiber collimation array and the output optical fiber collimation array are located in a same position on an optical axis, and the first optical switching engine and the third optical switching engine are located in a same position on the optical axis. The first optical switching engine and the third optical switching engine may include a total of P×Q optical switching units that are arranged in two dimensions, where P and Q are integers greater than or equal to 1.

In this embodiment, the first optical switching engine and the third optical switching engine perform angle deflection on the first beam on the first plane, and the dispersion unit performs, on the second plane, first-beam demultiplexing, and beam multiplexing to form the first beam such that optical switching in two dimensions is implemented, input and output ports are arranged in two dimensions, and ports can reach a large scale in quantity. In addition, the input and output ports can be switched to each other. Therefore, flexibility of WSS applications can be improved, and a single-fiber bidirectional application scenario can be supported.

A person of ordinary skill in the art may understand that, each aspect of the present disclosure or a possible implementation of each aspect may be implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit," "module," or "system" herein. In addition, each aspect of the present disclosure or a possible implementation of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable ROM (EPROM) or flash memory, an optical fiber, and a compact disc ROM (CD-ROM).

A processor in a computer reads computer-readable program code stored in a computer-readable medium such that the processor can perform a function and an action specified in each step or a combination of steps in a flowchart, and an apparatus is generated to implement a function and an action specified in each block or a combination of blocks in a block diagram.

All computer-readable program code may be executed on a user computer, or some may be executed on a user computer as a standalone software package, or some may be executed on a user computer while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The foregoing are merely example embodiments of the present disclosure. A person skilled in the art may make various modifications and variations to the present disclosure without departing from the spirit and scope of the present disclosure.

What is claimed is:
1. A wavelength selective switch (WSS), comprising:
   an input optical fiber collimation array,
   a first optical switching engine disposed proximate to the input optical fiber collimation array;
   a dispersion device disposed proximate to the first optical switching engine;
   an optical path converter disposed proximate to the dispersion device;
   a second optical switching engine disposed proximate to the optical path converter;
   a third optical switching engine disposed between the input optical fiber collimation array and the dispersion device; and
   an output optical fiber collimation array disposed proximate to the third optical switching engine,
   wherein the input optical fiber collimation array is configured to:
      input a first beam from a first port of the input optical fiber collimation array; and form the first beam incident to the first optical switching engine, wherein the first optical switching engine is configured to perform angle deflection on the first beam on a first plane according to a first preset angle such that the first beam is incident to the dispersion device, wherein the dispersion device is configured to demultiplex, on a second plane, the first beam that is incident from the first optical switching engine, into a plurality of sub-wavelength beams, wherein the second plane and the first plane are orthogonal to each other, wherein the optical path converter is configured to refract the plurality of sub-wavelength beams that are obtained after the dispersion device performs demultiplexing onto the second optical switching engine, wherein the second optical switching engine is configured to perform, according to a second preset angle, the angle deflection on the plurality of sub-wavelength beams that are obtained after the dispersion device performs demultiplexing, such that the plurality of sub-wavelength beams are incident to the dispersion device using the optical path converter, wherein the dispersion device is further configured to:
multiplex, on the second plane, the angle-deflected plurality of sub-wavelength beams; and
form the multiplexed plurality of sub-wavelength beams incident to the third optical switching engine, and wherein the third optical switching engine is configured to:
perform the angle deflection on the multiplexed plurality of sub-wavelength beams on the first plane according to a third preset angle; and
output the angle-deflected and multiplexed plurality of sub-wavelength beams from a second port of the output optical fiber collimation array.

2. The WSS according to claim 1, wherein the first port and the second port are ports that are arranged in two dimensions, and wherein the first port and the second port are in different rows and columns.

3. The WSS according to claim 1, wherein the first port and the second port are ports that are arranged in two dimensions, and wherein the first port and the second port are in different rows.

4. The WSS according to claim 1, wherein the first port and the second port are ports that are arranged in two dimensions, and wherein the first port and the second port are in different columns.

5. The WSS according to claim 1, wherein the input optical fiber collimation array and the output optical fiber collimation array are located in a same position on an optical axis, and wherein the first optical switching engine and the third optical switching engine are located in a same position on the optical axis.

6. The WSS according to claim 1, wherein a total quantity of first ports in the input optical fiber collimation array and second ports in the output optical fiber collimation array is P×Q, wherein the first optical switching engine and the third optical switching engine comprise a total of P×Q optical switches that are arranged in two dimensions, and wherein P and Q are integers greater than or equal to one.

7. The WSS according to claim 1, wherein the dispersion device is located on a front focal plane of the optical path converter, and wherein the second optical switching engine is located on a back focal plane of the optical path converter.

8. The WSS according to claim 1, wherein the optical path converter comprises a first optical path converter and a second optical path converter, wherein the first optical path converter is configured to perform refraction on the first plane, and wherein the second optical path converter is configured to perform refraction on the second plane.

9. The WSS according to claim 1, wherein a beam expanding device is further disposed between the first optical switching engine and the dispersion device, and wherein the beam expanding device is configured to:
receive the first beam on which the first optical switching engine has performed the angle deflection on the first plane; and
expand the first beam on the second plane.

10. The WSS according to claim 9, wherein the beam expanding device comprises a first lens, wherein the first optical path converter comprises a second lens, wherein the first beam on which the first optical switching engine has performed the angle deflection on the first plane converges on a front focal plane of the first lens, wherein the dispersion device is located on a back focal plane of the first lens and on a front focal plane of the second lens, and wherein the second optical switching engine is located on a back focal plane of the second lens.

11. The WSS according to claim 9, wherein the beam expanding device comprises a third lens and a fourth lens, wherein the first optical switching engine is located on a front focal plane of the third lens, wherein the dispersion device is located on a back focal plane of the fourth lens, and wherein a distance between the third lens and the fourth lens comprises a sum of focal lengths of the third lens and the fourth lens.

12. The WSS according to claim 1, wherein a polarization beam splitter (SP) and a half-wave plate are further disposed between the input optical fiber collimation array and the first optical switching engine, and wherein the polarization beam SP is configured to:
split, on the second plane, the first beam from the first port of the input optical fiber collimation array into a first sub-beam and a second sub-beam, wherein the first sub-beam and the second sub-beam have polarization components that are orthogonal to each other; and
multiplex, on the second plane, a third sub-beam that is incident from the half-wave plate to the polarization beam SP and a fourth sub-beam that is incident from the third optical switching engine to the polarization beam SP, into a beam, wherein the third sub-beam and the fourth sub-beam have polarization components that are orthogonal to each other, wherein a normal of an action plane of the half-wave plate is parallel to propagation directions of the first sub-beam and the third sub-beam, and wherein the half-wave plate is configured to:
convert the first sub-beam into a beam that has a same orthogonal polarization component as an orthogonal polarization component of the first sub-beam; and
convert the third sub-beam into a beam that has a same orthogonal polarization component as an orthogonal polarization component of the third sub-beam.

13. The WSS according to claim 1, wherein a polarization beam splitter (SP) and a half-wave plate are further disposed between the input optical fiber collimation array and the first optical switching engine, and wherein the polarization beam SP is configured to:
split, on the second plane, the first beam from the first port of the input optical fiber collimation array into a first sub-beam and a second sub-beam, wherein the first sub-beam and the second sub-beam have polarization components that are orthogonal to each other; and multiplex, on the second plane, a third sub-beam that is incident from the half-wave plate to the polarization beam SP and a fourth sub-beam that is incident from the third optical switching engine to the polarization beam SP, into a beam, wherein the third sub-beam and the fourth sub-beam have polarization components that are orthogonal to each other, wherein a normal of an action plane of the half-wave plate is coincides with propagation directions of the first sub-beam and the third sub-beam, and wherein the half-wave plate is configured to:
convert the first sub-beam into a beam that has a same orthogonal polarization component as an orthogonal polarization component of the first sub-beam; and
convert the third sub-beam into a beam that has a same orthogonal polarization component as an orthogonal polarization component of the third sub-beam.

14. The WSS according to claim 1, wherein central axes of the input optical fiber collimation array, the first optical switching engine, the dispersion device, the optical path converter, the second optical switching engine, the third optical switching engine, and the output optical fiber collimation array are parallel to a direction of the optical axis.

15. A wavelength selection method, comprising:
inputting, by an input optical fiber collimation array, a first beam from a first port;
forming, by the input optical fiber collimation array, the first beam incident from the first port to a first optical switching engine;
performing, by the first optical switching engine, angle deflection on the first beam on a first plane according to a first preset angle such that the first beam is incident to a dispersion device;
demultiplexing, by the dispersion device, on a second plane, the first beam that is incident from the first optical switching engine, into a plurality of sub-wavelength beams, wherein the second plane and the first plane are orthogonal to each other;
refracting, by an optical path converter, the plurality of sub-wavelength beams that are obtained after the dispersion device performs demultiplexing onto a second optical switching engine;
performing, by the second optical switching engine according to a second preset angle, the angle deflection on the plurality of sub-wavelength beams that are obtained after the dispersion device performs demultiplexing such that the plurality of sub-wavelength beams obtained by means of demultiplexing are incident to the dispersion device using the optical path converter;
multiplexing, by the dispersion device, on the second plane, the angle-deflected plurality of sub-wavelength beams;
forming, by the dispersion device, the multiplexed plurality of sub-wavelength beams incident onto a third optical switching engine;
performing, by the third optical switching engine, the angle deflection on the multiplexed plurality of sub-wavelength beams on the first plane according to a third preset angle; and
outputting, by the third optical switching engine, the angle-deflected and multiplexed plurality of sub-wavelength beams from a second port of an output optical fiber collimation array.

16. The method according to claim 15, wherein the first port and the second port are ports that are arranged in two dimensions, and wherein the first port and the second port are in different rows and columns.

17. The method according to claim 15, wherein the first port and the second port are ports that are arranged in two dimensions, and wherein the first port and the second port are in different rows.

18. The method according to claim 15, wherein the first port and the second port are ports that are arranged in two dimensions, and wherein the first port and the second port are in different columns.

19. The method according to claim 15, wherein the input optical fiber collimation array and the output optical fiber collimation array are located in a same position on an optical axis, and wherein the first optical switching engine and the third optical switching engine are located in a same position on the optical axis.

20. The method according to claim 15, wherein a total quantity of first ports in the input optical fiber collimation array and second ports in the output optical fiber collimation array is P×Q, wherein the first optical switching engine and the third optical switching engine comprise a total of P×Q optical switches that are arranged in two dimensions, and wherein P and Q are integers greater than or equal to one.

* * * * *